United States Patent [19]

Keene et al.

[11] Patent Number: 4,924,757

[45] Date of Patent: May 15, 1990

[54] LIGHTWEIGHT CYLINDER HEAD ATTACHMENT FOR FLUID ACTUATORS

[75] Inventors: Howard F. Keene, Renton; Frank M. Wyckoff, Seattle, both of Wash.

[73] Assignee: The Boeing Company, Seattle, Wash.

[21] Appl. No.: 108,721

[22] Filed: Oct. 13, 1987

[51] Int. Cl.[5] .......................... F01B 29/08; F16J 15/16

[52] U.S. Cl. .................................... 92/128; 92/165 R; 403/326

[58] Field of Search ............. 92/128, 146, 161, 165 R, 92/169.1; 403/261, 326, DIG. 7

[56] References Cited

U.S. PATENT DOCUMENTS

| | | | |
|---|---|---|---|
| 2,865,693 | 12/1958 | Barnhart | 92/169.1 |
| 3,169,455 | 2/1965 | Hoffman | 92/169.1 X |
| 3,474,710 | 10/1969 | Stryker | 92/128 |
| 3,494,652 | 2/1970 | Langland | 92/128 X |
| 3,598,021 | 7/1971 | Langland | 92/169.1 |
| 3,643,551 | 2/1972 | Berg | 92/128 |
| 3,722,374 | 3/1973 | Densmore | 92/128 |
| 3,881,401 | 5/1975 | Bimba | 92/169.1 |
| 4,024,802 | 5/1977 | Koppa | 403/261 X |
| 4,085,661 | 4/1978 | Schriever | 92/170 |
| 4,312,264 | 1/1982 | Nunnemacher | 92/161 |
| 4,357,858 | 11/1982 | Wedman | 92/128 |

FOREIGN PATENT DOCUMENTS

| | | | |
|---|---|---|---|
| 2045528 | 3/1971 | Fed. Rep. of Germany | 92/169.1 |

*Primary Examiner*—Robert E. Garrett
*Assistant Examiner*—Mark A. Williamson
*Attorney, Agent, or Firm*—Seed and Berry

[57] ABSTRACT

A mechanism for attaching a cylinder head on a hydraulic actuator to a cylinder uses a plurality of segmented, curved rings. The rings engage curved surfaces on a plug portion of the cylinder head and on the cylinder. Shear ring retaining plates position the shear ring segments. The cylinder head has a bearing which defines a bore for rotatably connecting the cylinder head to an external structure. The cylinder head also has a neck which joins the bearing with the cylinder plug. The neck has an enlarged dimension transverse to the bore axis and cylinder axis to minimize reaction forces against the shear ring segments generated by torque exerted against the bearing.

4 Claims, 3 Drawing Sheets

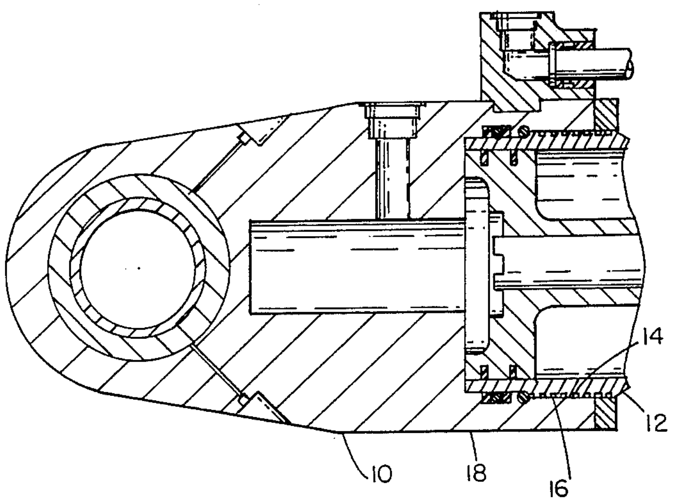
FIG. 1
PRIOR ART
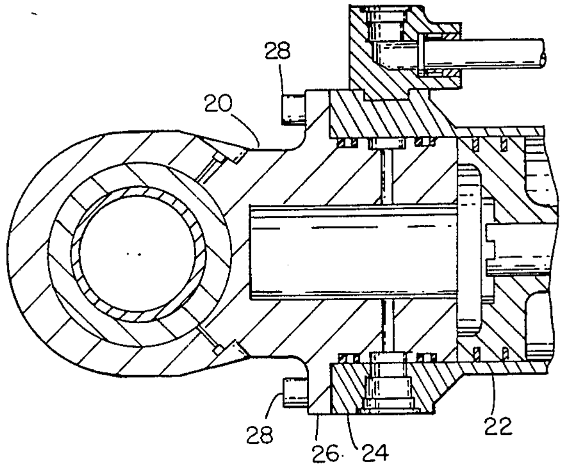
FIG. 2
PRIOR ART
FIG. 4
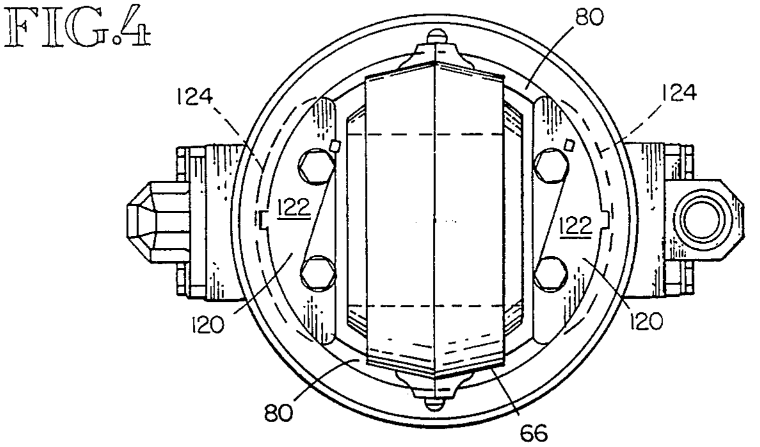

LIGHTWEIGHT CYLINDER HEAD ATTACHMENT FOR FLUID ACTUATORS

Statement of Government Interest

The United States government has certain rights in this invention.

TECHNICAL FIELD

The invention relates to fluid actuators. More specifically, the invention relates to cylinder head attachment mechanisms for hydraulic actuators of the type having double-acting pistons.

BACKGROUND ART

Double-acting hydraulic cylinders have been used to actuate relatively movable parts of an aircraft. For example, double-acting hydraulic actuators are often utilized for deploying and retracting aircraft landing gear, leading edge slats, trailing edge flaps and other control surfaces.

Two particular criteria which must be satisfied for aircraft components, including hydraulic actuators, are high strength and light weight. Achieving these two goals in a single device is often difficult. That is, an increase in strength also typically results in a corresponding increase in weight. This has been a particularly acute problem for double-acting hydraulic cylinders which are used in high-stress areas. For example, landing gear hydraulic actuators often must withstand internal pressures in excess of 3,000 psi. In a typical double-acting hydraulic cylinder, this load is always experienced as stress by the various components.

A typical double-acting hydraulic cylinder comprises a hollow cylinder having a piston rod end and a cylinder head end. A piston rod having a piston attached at one end reciprocates in the cylinder. The other end of the piston rod is attached to a bearing which defines a transverse bore for pivotal attachment of the piston rod to an external structure. The piston rod end of the cylinder is sealed with a gland which permits the piston rod to reciprocate therethrough. The cylinder head has a supporting structure for a bearing which also defines a bore for pivotally connecting the cylinder head to an external portion of the aircraft. Hydraulic fluid is selectively introduced into the cylinder between the cylinder head and piston the extend the piston rod, or the gland and piston to retract the piston rod. Thus, as stated above, the cylinder and cylinder head, or cylinder and gland, are always under tension.

In addition to the tensional force described above, the cylinder head and gland are also subject to torques which result from friction between the bearings on the cylinder head or piston rod and the pivotally attached aircraft portions. The magnitudes of torque which the cylinder head experiences are typically larger than the torques encountered by the gland on the piston rod end of the cylinder.

Consider a landing gear system which is actuated by a double-acting hydraulic cylinder. The piston rod bearing may be connected, for example, to a strut on a landing gear, and the landing gear typically pivotally connected to the aircraft frame. The cylinder head bearing is typically connected to the air frame so that introduction of hydraulic fluid between the cylinder head and piston causes extension of the landing gear, and introduction of hydraulic fluid between the gland and piston retracts the landing gear. The torque generated by friction between the landing gear strut and piston rod bearing is transferred to the cylinder by the gland and the piston. Thus, torque is divided proportionately between these two structures. However, any torque generated at the cylinder head bearing is transferred to the cylinder through a connection between the cylinder head and cylinder only. Thus, a more robust connection has been employed between the cylinder head and cylinder (with a corresponding weight penalty) than between the gland and cylinder.

FIG. 1 illustrates a conventional prior art technique for joining a cylinder head 10 with a cylinder 12. As seen in the figure, the cylinder 12 has external threads 14 which mate with internal threads 16 on a downwardly extending lip 18 of the cylinder head 10. This mounting technique suffers from two distinct disadvantages. The internal and external threads have been known to fail under hydraulic pressures in excess of 3,000 psi. Furthermore, the cylinder head 10 is heavy and bulky.

FIG. 2 illustrates a second prior art technique for joining a cylinder head 20 with a cylinder head 22. In this prior art technique, the cylinder has a peripheral, radially extending flange 24 which mates with a corresponding flange 26 on the cylinder head 20. Bolts 28 connect the flanges. The structure shown in FIG. 2 is somewhat stronger than the structure shown in FIG. 1. However, the additional weight and bulk of the flanges and bolts are undesirable. Thus, a need exists for a lightweight structure having sufficient strength to join a cylinder head with a cylinder and hydraulic fluid actuator.

It is known that a gland 30, shown in the righthand side of FIG. 3, can be secured to a cylinder 32 by means of a segmented shear ring 34. The shear ring has multiple arcuate segments which transmit axial force from hydraulic pressure in the cylinder to a radially outward force against the cylinder. This mounting structure is low in weight and provides a high-strength connection between the gland and the cylinder. However, it is believed that this technique would be inapplicable to mounting the cylinder head to the cylinder because of the large, torqueinduced stresses encountered by the cylinder head.

DISCLOSURE OF THE INVENTION

The invention provides a lightweight attachment mechanism for attaching a cylinder head to a cylinder. The cylinder head has a cylinder plug which closes the cylinder. The cylinder plug and cylinder have cooperative curved surfaces which together define a circular trough having a curved bottom. A plurality of cylindrical, arcuate shear ring segments are received in the trough to prevent relative axial movement of the cylinder and cylinder head. Hydraulic pressure against the cylinder plug tends to rotate the arcuate shear ring segments in the trough. However, the arcuate shear ring segments are curved and therefore cannot rotate in the trough. As a result, the ring segments "jam" in the trough and prevent relative axial movement of the cylinder and cylinder head.

In the preferred embodiment of the invention, an inner wall on the cylinder head has an inner, concave, curved surface and a radially inwardly extending lip. The cylinder plug has an outer concave surface which corresponds to the inner concave surface on the cylinder inner wall. The plug portion is positionable within the cylinder so that the curved surfaces cooperate to define the circular trough having the curved bottom.

The cylindrical, arcuate shear ring segments are received in the trough and are positioned therein by shear plates. The shear plates have a first portion which is connectable to the cylinder head and a second portion which is insertable between the shear ring segments and the radially inwardly extending lip. Hydraulic pressure between the cylinder head and a reciprocating piston in the cylinder causes the shear ring segments to exert an outward force on the cylinder inner wall. No substantial force is exerted against the shear plates.

The cylinder head has a bearing portion defining a bore which is transverse to the cylinder access. The bearing is connected to the plug portion by a neck portion. The neck portion has an enlarged dimension, transverse to the bore and cylinder axes, to reduce torque reaction forces transmitted to the shear ring segments from the cylinder head bearing.

A flexible annular ring is provided to facilitate assembly of the double-acting hydraulic actuator. The flexible annular ring has an outer surface which complements and fills the inner, concave, curved surface on the cylinder wall. The flexible ring has a smooth inner diameter to facilitate movement of a piston having piston rings thereby. The annular ring is first inserted into the cylinder; the piston inserted beyond the flexible ring; and the ring removed. The cylinder head may then be attached to the cylinder by inserting the shear ring segments and attaching the shear plates. The flexible ring prevents the piston rings from "jamming" in the inner, concave, curved surface on the cylinder inner wall.

BRIEF DESCRIPTION OF THE DRAWINGS

FIG. 1 is an enlarged, sectional, elevational view of a prior art cylinder head attachment technique.

FIG. 2 is an enlarged, sectional, elevational view of a second prior art cylinder head attachment technique.

FIG. 4 is a frontal elevational view of the cylinder head.

BEST MODE FOR CARRYING OUT THE INVENTION

Figure 3:
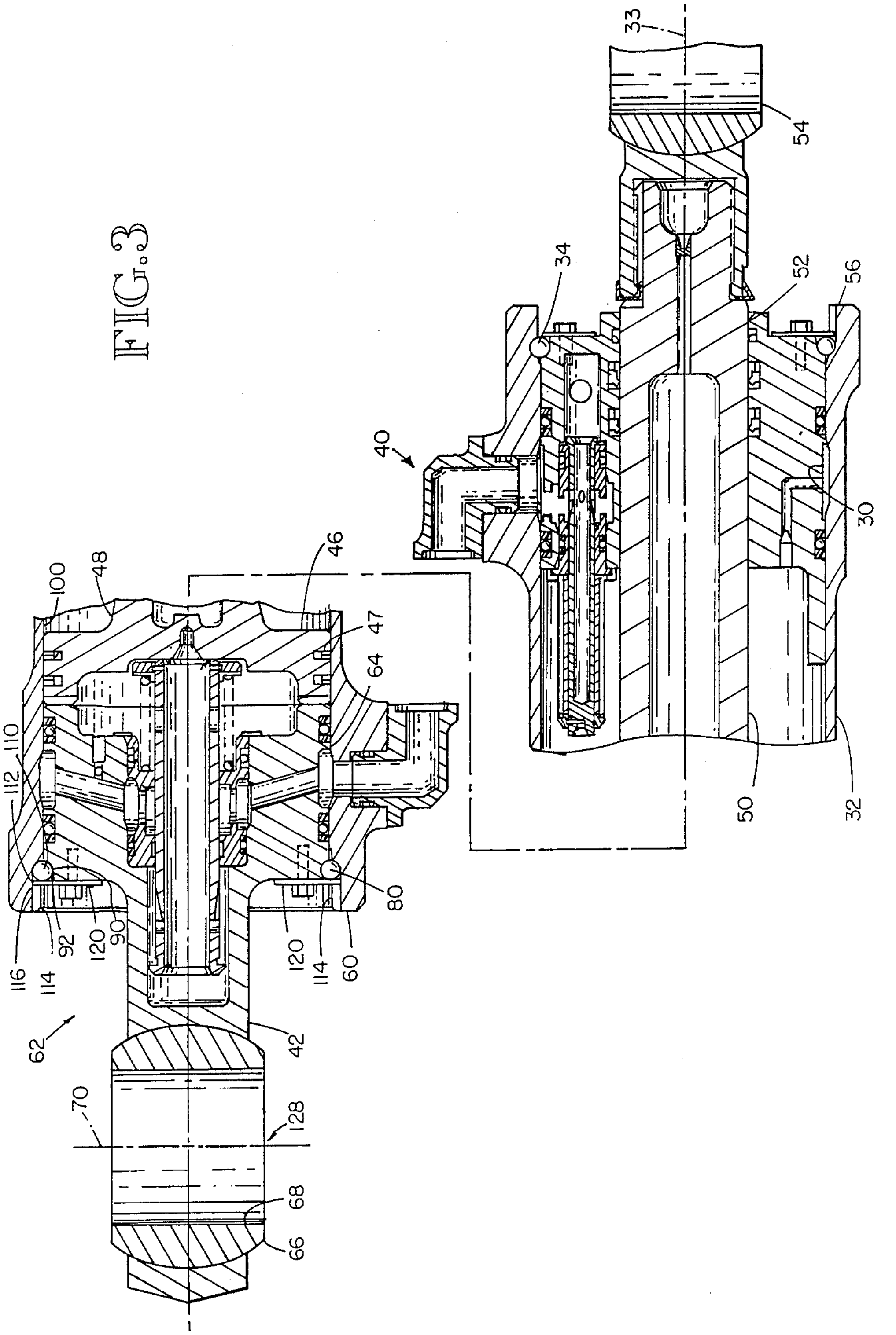
FIG. 3 is a partial, sectional, elevational view of an hydraulic actuator illustrating a prior art gland attachment technique and the cylinder head attachment of the present invention.

A hydraulic actuator, in accordance with the present invention, is generally indicated at reference numeral 40 in FIG. 3. The actuator has an elongated cylinder 32 defining a cylinder axis 33. The cylinder houses a reciprocating piston 46 having piston rings 47. The piston is attached to a first end 48 of a piston rod 50. The piston rod has a second end 52 which is threadedly connected to a piston rod bearing 54. The cylinder 44 has a piston rod end 56 which is sealed by a gland 30 previously described. The gland is retained in the cylinder 32 by a plurality of segmented shear rings 34 as previously described. The cylinder 32 also has a cylinder head end 60 which receives a cylinder head, generally indicated at reference numeral 62.

As best seen in FIG. 3, the cylinder head has a cylindrical plug portion 64 which is slideably received by the cylinder 32. The cylinder head also has a cylinder head bearing 66 which defines a bore 68 having a bore axis 70 which is transverse to the cylinder axis 33. The cylinder head bearing 66 and cylinder plug portion 64 are joined by a neck portion 72.

As best seen in FIGS. 3 and 4, three cylindrical, arcuate shear ring segments 80, similar to the shear ring segments 34, are provided to retain the cylinder plug portion 64 within the cylinder 32 (as shown in FIG. 3) against tensional forces generated by hydraulic pressure between the cylinder plug portion 64 and piston 46.

The cylinder plug portion 64 is provided with a peripheral, concave, curved surface 90 which provides an inner bearing support for the shear ring segments 80. The curved surface 90 circumscribes at least one-quarter of a circle having a radius of curvature approximately equal to the cross-sectional radius of the shear ring segments 80. An annular surface 92 extends axially outwardly from the curved surface 90.

The cylinder 32 has an inner wall 100. The inner wall has, at the cylinder head end 57 of the cylinder, an inner, concave, curved surface 110 which corresponds to the curved surface 90 on the cylinder plug portion 64. The curved surface 110 provides an outer bearing support for the shear ring segments. The inner wall 100 also has an annular inner wall 112 which extends axially outwardly from the curved surface 110 and which corresponds to the annular surface 92 on the cylinder plug portion 64. The curved surface 110 circumscribes at least one-quarter of a circle having a radius of curvature approximately equal to the cross-sectional radius of the shear ring segments 80.

The annular inner wall 112 has a length which is slightly longer than the length of the annular surface 92 on the cylinder plug portion 64. The annular inner wall 112 abuts a radially inwardly directed lip 114 which defines an inner, circumferential, right-angle shoulder 116 on the inner wall 100 of the cylinder 32.

As best seen in FIG. 3, when the cylinder 32 and cylinder plug portion 64 are aligned as shown, the curved surfaces 90, 110 and annular walls 92, 112 define an annular trough having vertical side walls and a curved bottom. The curved bottom corresponds in shape to approximately one-half of the shape of the shear ring segments 80.

Preferably, the three arcuate, shear ring segments 80 each subtend an angle of less than approximately 120°. Each segment thus forms a "C"-shaped segment of a toroid. The segments have a radius of curvature selected to equal that of the trough so that the segments can reside in the trough.

Two shear ring retaining plates 120, as best seen in FIGS. 3 and 4,are provided to retain the shear rings in the trough. The shear rings have first portions 122 (FIG. 6) which are bolted or otherwise removably attached to the cylinder plug portion 64. The shear ring retaining plates have second portions 124 which extend between the circumferential right-angle shoulder 116 and the shear ring segments 80 (see FIG. 3). In this way, the shear rings 80 are retained in the trough. It is to be understood that compressive loads exerted by the cylinder plug portion 64 against the shear ring segments are completely transmitted by the shear ring segments 80 and curved surfaces 90, 110 to the cylinder 32 as radial forces. The shear ring retaining plates 120 do not encounter any substantial load. Hydraulic pressure on the cylindrical plug portion 64 tends to rotate the shear ring segments 80 about their cross sectional axes. However, the shear ring segments are "C"-shaped and therefore cannot rotate in the circular trough. As a result, ends 126 of the shear ring segments press inwardly against the annular wall 92, and midsections 127 of the shear ring segments press outwardly against the curved surface 110, resulting in the ring segments becoming "jammed" in the trough (see FIG. 6). In this way, relative axial movements of the cylinder 32 and cylinder head 62 are prevented.

Figure 5:
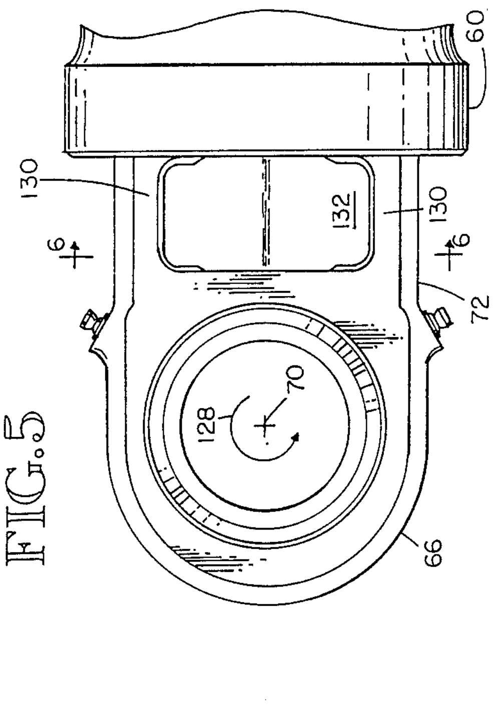
FIG. 5 is a side elevational view of the bearing and neck portions of the cylinder head.

The neck portion 72 of the cylinder head 62 is designed to minimize torque-induced forces exerted against the shear ring segments 80. Excessive radial forces can be induced by friction-generated torque from the bore 68 and the bearing 66 of the cylinder head 62. Such a condition could occur, for example, in a landing gear system which has been locked in an over-center condition. The landing gear will typically retract on a spring-loaded, damped, telescoping member during landing or takeoff. Thus, relative pivotal movement between the landing gear strut and cylinder head bearing 66 will occur. As shown in FIGS. 3 and 5, if the torque generated by friction in the bearing 66 is in the direction of arrow 128, the reaction force applied to the shear ring segments 80 will be inversely proportionate to the thickness of the neck 72. Therefore, the neck portion is made as wide as possible along a dimension transverse to both the bore axis 70 and cylinder axis 33.

Figure 6:
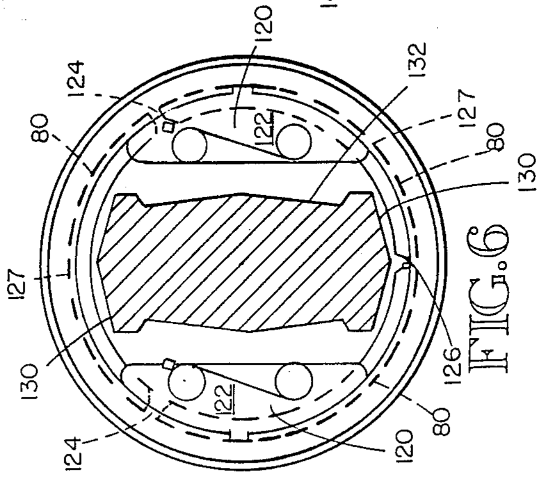
FIG. 6 is a sectional view taken along lines 6-6 of FIG. 5.

As shown in FIGS. 5 and 6, the neck portion 72 preferably has an "I"-beam cross-sectional shape having parallel flanges 130 joined by a web section 132. This structure provides high strength and low weight, and minimizes the magnitude of torque-induced reaction forces transmitted to the shear ring segments 80.

Figure 7:
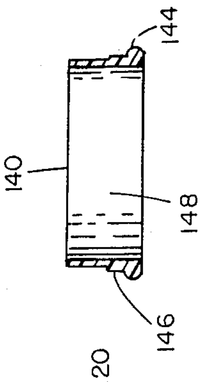
FIG. 7 is a sectional, elevational view of a flexible annular ring used during assembly of the invention.

To facilitate assembly of the hydraulic actuator 40, a resilient annulus 140, shown in FIG. 7, is provided. It has been found that when inserting the piston 46 and piston rings 47 into the cylinder 32, the piston rings tend to expand and jam in the depression defined by the curved surface 110 and the annular inner wall 112. The resilient annulus 140 has a hemispherical peripheral portion 144 and an adjacent annular portion 146 which are sized to be received in the curved surface 110 and annular inner wall 112, respectively. The resilient annulus 140 also has a smooth inner wall 148 having an inner diameter approximately equal to the inner diameter of the cylinder 32.

The actuator 40 is assembled by first inserting the resilient annulus 140 into the cylinder head 57 of the cylinder 32. The piston 46, piston rings 47, and piston rod 50 are then inserted into the cylinder as shown in FIG. 3. The piston rings 47 slide over the inner wall of the resilient annulus 140 without expanding into the curved surface 110 or annular inner wall 112. The resilient annulus is then removed. The cylinder head 62 and shear ring segments 80 are then inserted, and the shear ring retaining plates 120 are positioned as shown. Bolts or other attachment mechanisms are then used to attach the shear ring retaining plates to the cylinder head 62.

Other variations and embodiments of the invention are contemplated. Therefore, the invention is not to be limited by the above description but is to be determined in scope by the claims which follow.

We claim:

1. A lightweight, cylinder head attachment mechanism for use on hydraulic actuators of the type having a cylindrical housing and an internal reciprocating piston, comprising:

a hollow cylinder defining a cylinder axis and having a piston rod end, a cylinder head end, and an inner wall of substantially constant diameter, wherein the inner wall has an inner, concave, curved surface and a radially inwardly extending lip at the cylinder head end;

a cylinder head having a bearing portion defining a bore and a bore axis transverse to the cylinder axis, a neck portion attached to the bearing portion, and a cylinder plug portion connected to the neck portion, wherein the cylinder plug portion has a diameter sized to slideably engage the cylinder inner wall, and also has an outer, concave, curved surface corresponding to the inner, concave, curved surface on the cylinder inner wall, wherein the plug portion is positionable within the cylinder so that the curved surfaces cooperate to define an annular trough having a curved bottom;

a plurality of cylindrical, arcuate shear ring segments for receipt within the trough, and retaining means for retaining the shear ring segments in the trough, including a shear plate having a first portion connectable to the cylinder head and a second portion insertable between the shear ring segments and the radially inwardly extending lip, whereby hydraulic pressure in the cylinder and on the cylinder plug portion causes the shear ring segments to exert an outward force on the cylinder inner wall.

2. The cylinder head attachment of claim 1 wherein the neck portion has an enlarged dimension, transverse to the bore and cylinder axes, to minimize torque-induced reaction forces on the shear ring segments.

3. The cylinder head attachment of claim 2 wherein the neck portion has two substantially parallel flanges parallel to the bore and cylinder axes and a web section between the flanges.

4. A lightweight cylinder head attachment mechanism for use on hydraulic actuators of the type having a cylindrical housing and an internal reciprocating piston, comprising:

a hollow cylinder defining a cylinder axis and having a cylinder head end having an inner, circumferential, concave surface forming one half of a circular trough and also having an inwardly extruding lip;

a cylinder head having a cylinder plug received in the cylinder at the cylinder head end, the cylinder plug having an outer, circumferential, curved surface corresponding to the inner, circumferential, curved surface on the cylinder head end of the hollow cylinder so as to form the other half of the circular trough;

a plurality of cylindrical, arcuate shear ring segments positionable to prevent relative axial movement of the cylinder plug and the hollow cylinder; and a retaining mechanism having a first portion connectable to the cylinder head and a second portion insertable between the shear ring segments and the inwardly extending lip to retain the shear ring segments in place, whereby hydraulic pressure in the cylinder and on the cylinder plug portion causes the shear ring segments to exert an outward force on the cylinder inner wall.

* * * * *